United States Patent
Ota

(10) Patent No.: US 7,886,400 B2
(45) Date of Patent: Feb. 15, 2011

(54) MOTOR AND WIPER APPARATUS HAVING THE SAME

(75) Inventor: Kiyoshi Ota, Hoi-gun (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 880 days.

(21) Appl. No.: 11/826,066

(22) Filed: Jul. 12, 2007

(65) Prior Publication Data

US 2008/0022477 A1  Jan. 31, 2008

(30) Foreign Application Priority Data

Jul. 27, 2006  (JP) .............................. 2006-204481

(51) Int. Cl.
*H02K 7/116* (2006.01)
(52) U.S. Cl. ................... 15/250.3; 15/250.34; 74/425
(58) Field of Classification Search ............... 15/250.3, 15/250.31, 27; 74/425
See application file for complete search history.

(56) References Cited

U.S. PATENT DOCUMENTS

| | | | | |
|---|---|---|---|---|
| 3,742,781 A | * | 7/1973 | Boyriven | 74/625 |
| 4,944,375 A | * | 7/1990 | Ohta et al. | 192/223.2 |
| 5,855,140 A | * | 1/1999 | Imamura | 74/42 |

FOREIGN PATENT DOCUMENTS

JP  A-2005-094821  4/2005

* cited by examiner

*Primary Examiner*—Monica S Carter
*Assistant Examiner*—Stephanie Newton
(74) *Attorney, Agent, or Firm*—Posz Law Group, PLC

(57) ABSTRACT

In a motor, a gear housing of a speed reducer is connected to a motor unit. A worm is received in the gear housing and is rotated by rotation of a rotatable shaft of the motor unit. A worm wheel is received in the gear housing and is meshed with the worm. An output shaft is fixed to a center part of the worm wheel. The worm wheel includes a receiving recess, which is axially recessed in a center part of the worm wheel. An axially inner part of a bearing, which rotatably supports the output shaft, is received in the receiving recess.

18 Claims, 5 Drawing Sheets

MOTOR AND WIPER APPARATUS HAVING THE SAME

CROSS REFERENCE TO RELATED APPLICATION

This application is based on and incorporates herein by reference Japanese Patent Application No. 2006-204481 filed on Jul. 27, 2006.

BACKGROUND OF THE INVENTION

1. Field of the Invention

The present invention relates to a motor and a wiper apparatus having the same.

2. Description of Related Art

For example, Japanese Unexamined Patent Publication Number 2005-94821 discloses a motor that is used as a drive source of a vehicle wiper apparatus. With reference to FIG. 6, this motor includes a motor unit 50 and a speed reducer 55. The motor unit 50 is rotated to rotate a rotatable shaft 51, to which a worm 51a is formed integrally. The speed reducer 55 is connected to the motor unit 50 and reduces a rotational speed of rotation transmitted from the rotatable shaft 51. Specifically, the speed reducer 55 has a speed reducing mechanism, which includes the worm 51a and a worm wheel 57 received in a gear housing 56 that is connected to the motor unit 50. When the worm 51a and the worm wheel 57 are rotated upon rotation of the motor unit 50, an output shaft 58, which is fixed to the worm wheel 57, is rotated to rotate a crank arm 60 of a link mechanism. Then, the rotation of the crank arm 60 is converted into reciprocal swing movement of wipers (not shown) through the link mechanism.

A base end portion of the output shaft 58 is fixed to a center part of the worm wheel 57, and a distal end portion of the output shaft 58 extends outward through a cylindrical shaft support 56a, which projects from an outer surface of the gear housing 56. One end portion of the crank arm 60 is connected to the projected distal end portion of the output shaft 58. A cylindrical bearing 59 is fixed to an inner peripheral surface of the shaft support 56a, and an intermediate portion of the output shaft 58 is rotatably supported by the bearing 59.

However, the output shaft 58 is fixed to the center part of the worm wheel 57 only at the one axial end portion and is supported by the bearing 59 on one side of the worm wheel 57. An axial extent of the bearing 59 is displaced from an axial extent of an engaging part 57a, which is provided at an outer peripheral part of the worm wheel 57, when they are viewed in a direction perpendicular to an axis Lc of the output shaft 58. Particularly, a straight line Ld, which is perpendicular to the axis Lc of the output shaft 58 and passes through a contact point (pitch point) P12 between the worm 51a and the worm wheel 57, is axially largely displaced from an axial support range B of the bearing 59.

Thus, when the load (wipers) is driven by rotating the output shaft 58, the output shaft 58 may possibly be tilted in some cases. The tilting of the output shaft 58 is particularly notable in the above case where the crank arm 60 is driven by the output shaft 58. In such a case, the output shaft 58 is tilted about a fulcrum P11, which is located at an axial center point of the bearing 59 along a central axis of the bearing 59. Thus, when the worm wheel 57, the output shaft 58 and the bearing 59 are arranged in the above described manner, a distance L11 between the fulcrum P11 and the contact point P12 becomes relatively long. This poses the following disadvantage. That is, the tilting of the output shaft 58 causes a signification change in an engaged state between the engaging part 57a of the worm wheel 57 and the worm 51a. This will result in disadvantages, such as generation of noise as well as increased frictional wearing at the engaged part between the engaging part 57a of the worm wheel 57 and the worm 51a.

Furthermore, it should be noted that the output shaft 58 could be also tilted about the fulcrum P11 by an urging force, which is generated by the rotation of the worm 51a to push the worm wheel 57 in a direction away from the worm 51a. In such a case, when the distance L11 between the contact point P12 and the fulcrum P11 is relatively long, the load, which is applied to the bearing 59 to tilt the output shaft 58, is disadvantageously increased. This may cause an increase in sliding noise generated from the bearing 59 and an increase in frictional wearing of the bearing 59.

SUMMARY OF THE INVENTION

The present invention addresses the above disadvantage. Thus, it is an objective of the present invention to provide a motor, which includes an output shaft fixed to a worm wheel driven by a worm and which can alleviate or limit an influence of tilting of the output shaft on operation of the motor. It is another objective of the present invention to provide a wiper apparatus, which includes such a motor.

According to one aspect of the present invention, there is provided a motor, which includes a motor unit and a speed reducer. The motor unit includes a rotatable shaft, which is rotated upon energization of the motor unit. The speed reducer includes a gear housing, a worm, a worm wheel and an output shaft. The gear housing is connected to the motor unit. The worm is received in the gear housing and is rotated by rotation of the rotatable shaft. The worm wheel is received in the gear housing and is meshed with the worm. The output shaft is fixed to a center part of the worm wheel and is rotatably supported by the gear housing through a bearing to externally output a drive force. The worm wheel includes a receiving recess, which is axially recessed in the center part of the worm wheel. At least a portion of the bearing is received in the receiving recess.

There is also provided a wiper apparatus, which includes the above motor and a link mechanism. The link mechanism includes a crank arm, which is fixed to the output shaft of the motor and is rotated by the output shaft. Rotational movement of the crank arm is converted into reciprocal swing movement through the link mechanism to swing a wiper.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings.

Figure 1:
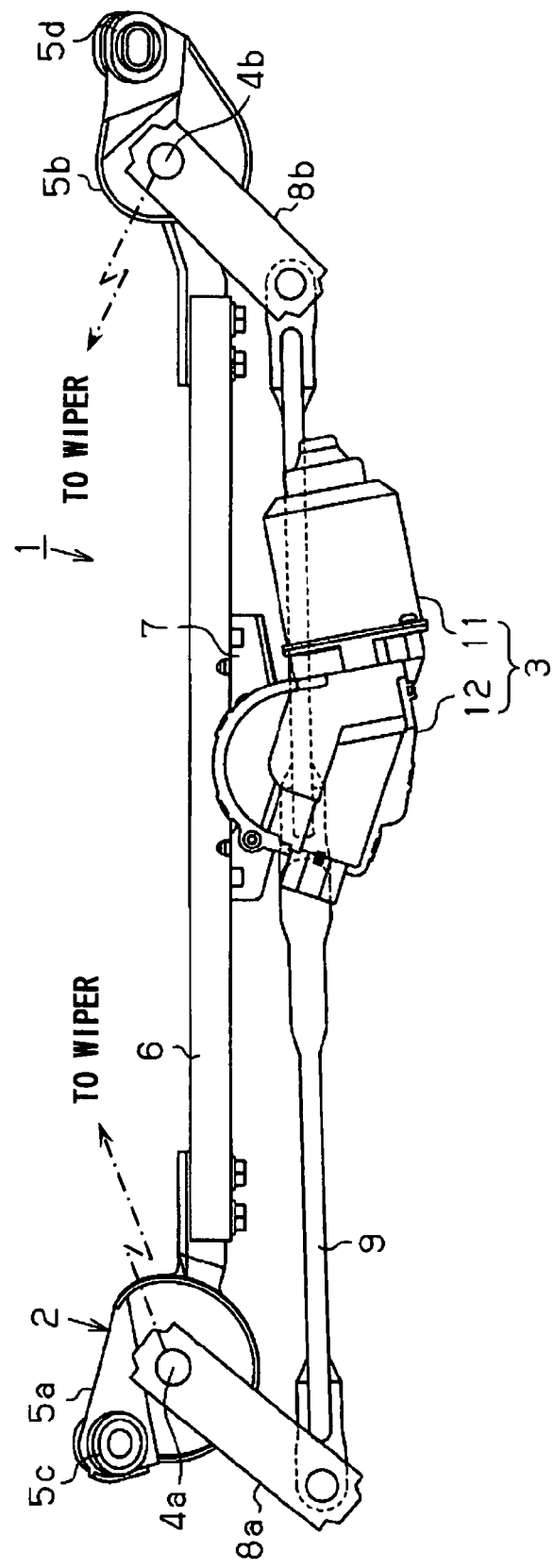
FIG. 1 is a schematic diagram showing a modular type wiper apparatus according to an embodiment of the present invention.

FIG. 1 shows a modular type wiper apparatus 1 according to an embodiment of the present invention. The modular type wiper apparatus 1 includes a wiper drive mechanism (also serving as a link mechanism) 2 and a motor 3, which are assembled together. The wiper drive mechanism 2 includes two pivot holders 5a, 5b, which are fixed to ends, respectively, of a frame 6 and rotatably support pivot shafts 4a, 4b, respectively (only base end portions of the pivot shafts 4a, 4b are shown in FIG. 1). Each pivot holder 5a, 5b has a connecting portion 5c, 5d that is used to connect, i.e., install the modular type wiper apparatus 1 to a vehicle body. Furthermore, a fixture 7 is provided to a center part of the frame 6, and the motor 3 is fixed to the fixture 7.

A pivot lever 8a, 8b is provided to each pivot shaft 4a, 4b in such a manner that a base end portion of the pivot lever 8a, 8b is fixed to a base end portion of the pivot shaft 4a, 4b to rotate integrally therewith. A distal end portion of the pivot lever 8a and a distal end portion of the pivot lever 8b are connected with each other through a link rod 9. A center portion of the link rod 9 is connected to a crank arm 10 (FIG. 3), which is fixed to an output shaft 22 of the motor 3 to rotate integrally therewith. When the motor 3 is rotated, the crank arm 10 is rotated to reciprocally swing the pivot levers 8a, 8b through the link rod 9. Through the swing movement of the pivot levers 8a, 8b of the link mechanism, the pivot shafts 4a, 4b are reciprocally swung within a predetermined angular range thereof. Thus, wipers (not shown), which are fixed to distal end portions, respectively, of the pivot shafts 4a, 4b, are swung to perform its predetermined wiping movement.

Figure 2:
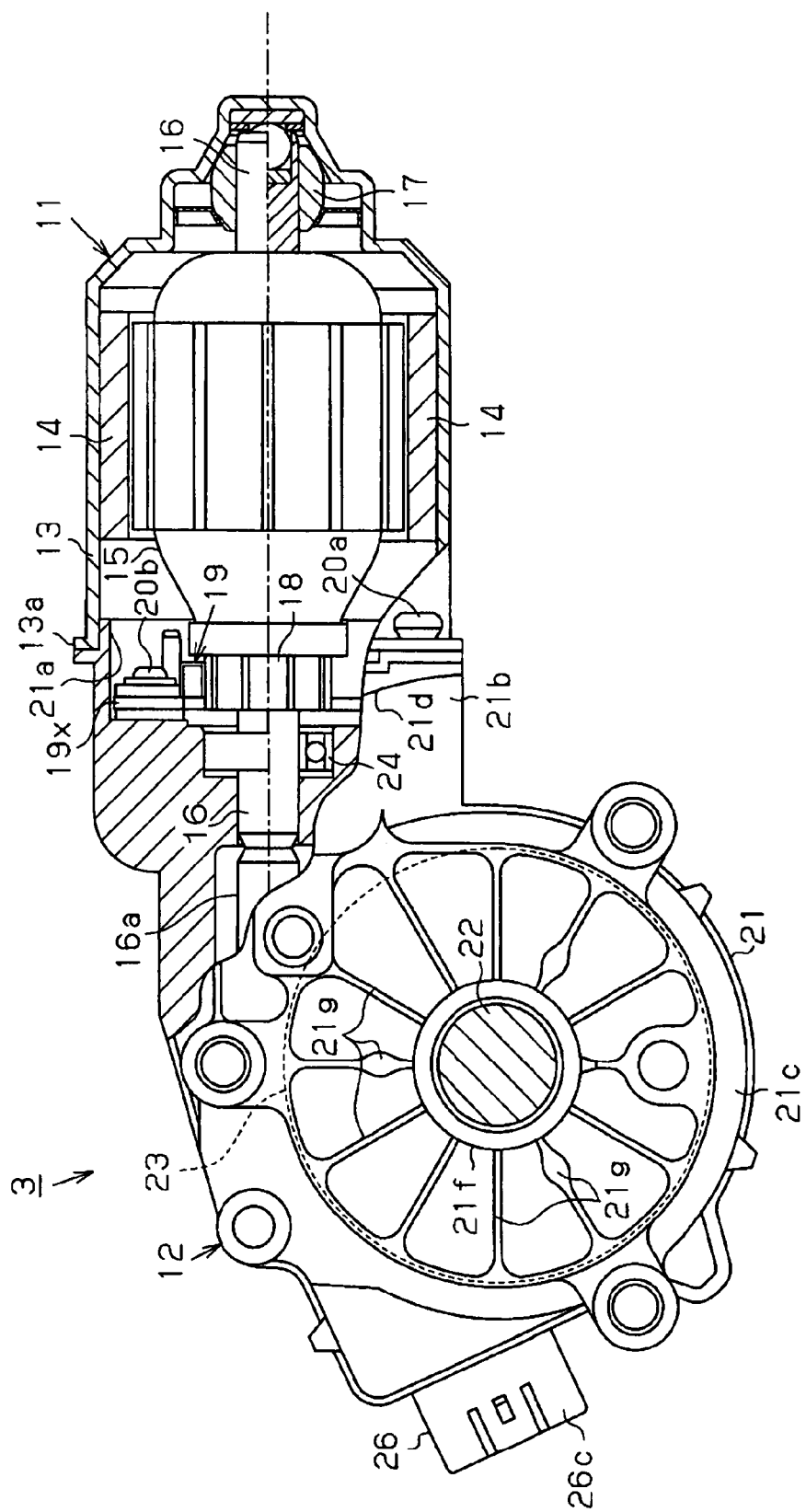
FIG. 2 is a fragmented diagram showing a motor of the wiper apparatus of the present embodiment.

As shown in FIG. 2, the motor 3 includes a motor unit 11 and a speed reducer 12. The motor unit 11 forms a brushed direct current motor. The speed reducer 12 is connected to the motor unit 11 to receiver rotation from the motor unit 11 and to reduce a rotational speed of the received rotation before it is outputted from the speed reducer 12. The motor unit 11 includes a cup shaped yoke housing 13. A plurality of magnets 14 is fixed to an inner peripheral surface of the yoke housing 13. An armature 15 is rotatably received in the yoke housing 13 at a location radially inward of the magnets 14. A base end portion of a rotatable shaft 16 of the armature 15 is rotatably supported by a bearing 17, which is provided to a base of the yoke housing 13. A gear housing 21 of the speed reducer 12 is fixed to a yoke opening 13a of the yoke housing 13 with screws 20a.

The gear housing 21 includes a connecting portion 21b and a gear receiving portion 21c, which are formed integrally by, for example, die-casting from a metal material (e.g., an aluminum alloy, a zinc alloy). The connecting portion 21b has an opening recess 21a, a size of which is substantially the same as that of the yoke opening 13a. The gear receiving portion 21c receives a speed reducing mechanism, which includes a worm 16a and a worm wheel 23. The worm 16a is formed at a distal end portion of the rotatable shaft 16. The worm 16a is made of a metal material (or a resin material).

Figure 4:
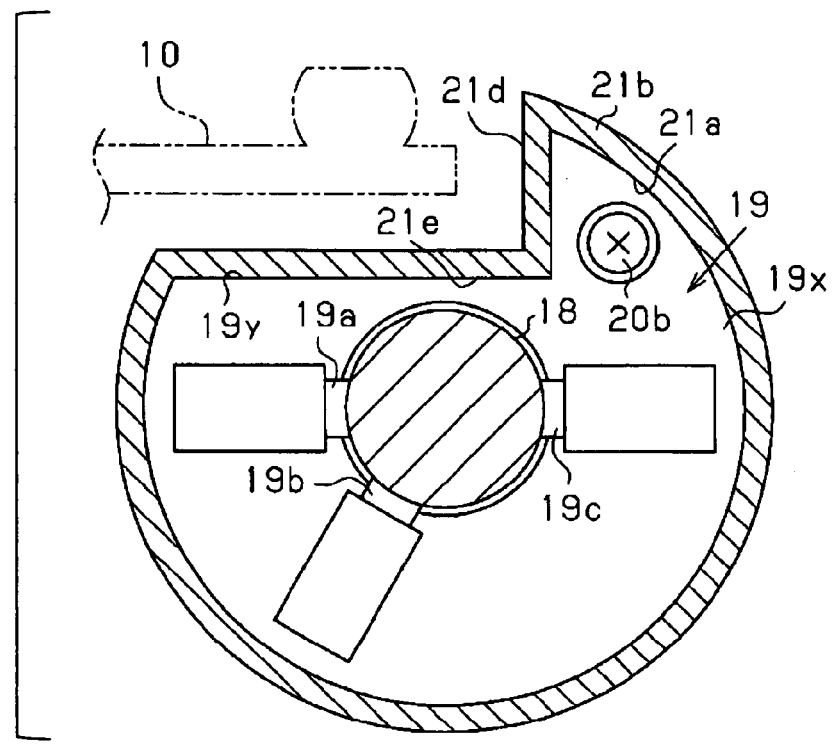
FIG. 4 is a cross sectional view showing a brush device of the motor of the present embodiment.

A bearing 24 is provided to a base center part of the opening recess 21a of the connecting portion 21b to rotatably support an intermediate part of the rotatable shaft 16 between the worm 16a and a commutator 18 fixed to the rotatable shaft 16. A brush device 19, which supplies electric power to the commutator 18, is provided in the opening recess 21a, as shown in FIG. 4. The brush device 19 includes power supply brushes 19a-19c, which are slidably engaged with the commutator 18 and are supported on a circuit board 19x. The circuit board 19x is shaped into a generally annular body, a portion (an upper left part in FIG. 4) of which is notched or cut. Furthermore, the circuit board 19x is fixed to the connecting portion 21b of the gear housing 21 with screws 20b.

A recess 21d is provided to an outer peripheral surface of the connecting portion 21b to avoid an interference with a distal end portion of the crank arm 10, which is driven to swing. In this way, the recess 21d of the outer peripheral surface of the connecting portion 21b forms a bulge 21e, which is bulged inwardly, at an interior of the opening recess 21a. A rectangular shaped notch 19y is formed in the circuit board 19x by notching an outer peripheral edge part of the circuit board 19x to avoid an interference with the bulge 21e. The power supply brush (low speed drive brush) 19a and the power supply brush (common brush or grounding brush) 19c are opposed to each other about the commutator 18 along an edge (a left-to-right edge in FIG. 4) of the notch 19y. The power supply brush (high speed drive brush) 19b is displaced by a predetermined angle from the power supply brush (low speed drive brush) 19a on a side opposite from the notch 19y.

Figure 5:
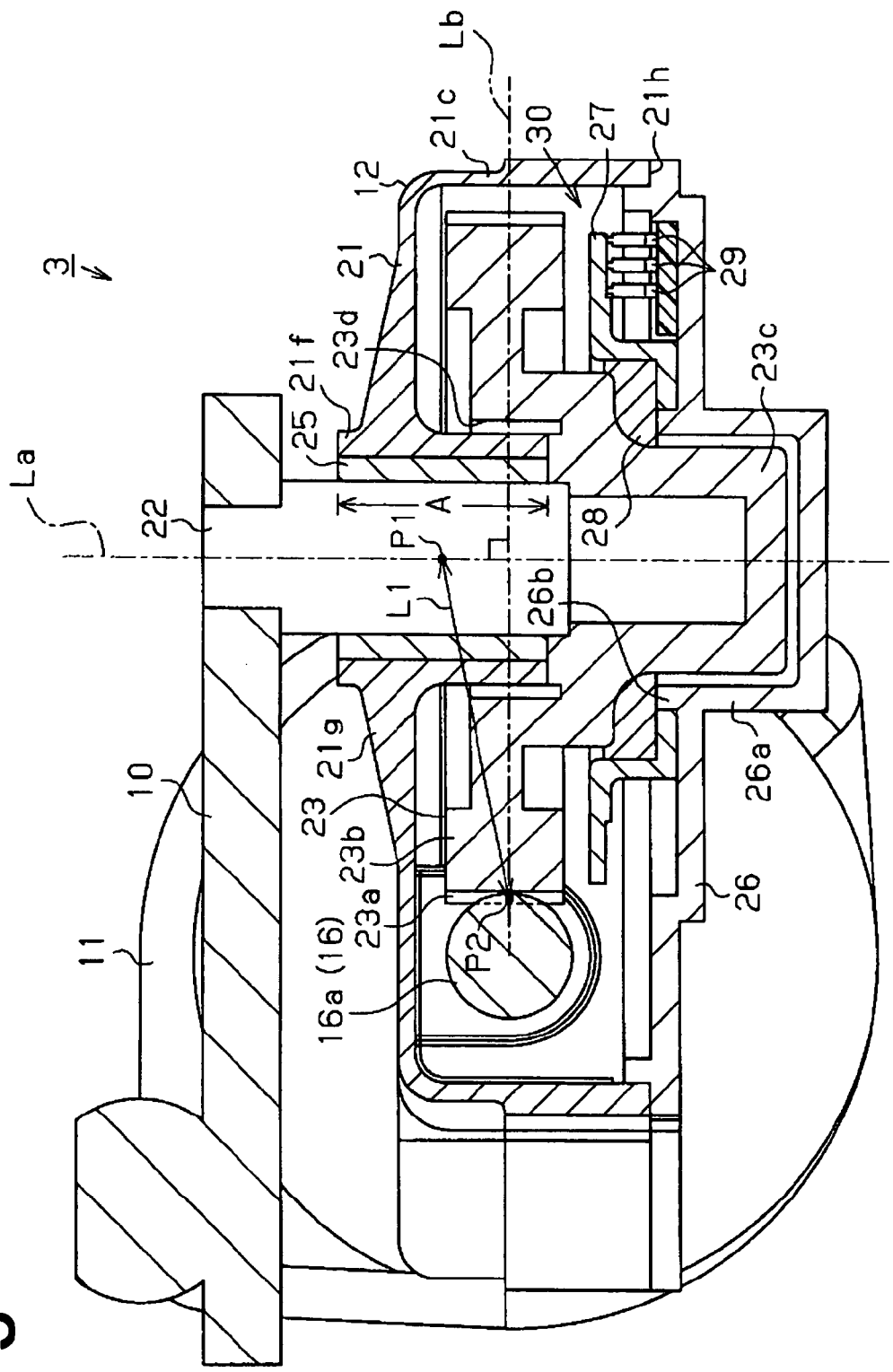
FIG. 5 is a cross sectional view showing an output shaft of the motor of the present embodiment.

As shown in FIG. 5, a cylindrical shaft support 21f is provided at a center part of the gear receiving portion 21c to project both axially outward and inward. The shaft support 21f rotatably supports the output shaft 22 that is fixed to a center part of the worm wheel 23. Multiple reinforcing ribs 21g radially outwardly project from an outer peripheral surface of the outwardly protruding shaft support 21f along an outer surface (a top outer surface in FIG. 5) of the gear receiving portion 21c (also see FIG. 2) to reinforce the shaft support 21f and the gear receiving portion 21c. A bearing 25 is fixed to an inner peripheral surface of the shaft support 21f to rotatably support an axially intermediate part of the output shaft 22. The bearing 25 is formed as a cylindrical plain bearing that extends from an axially outer end to an axially inner end of the shaft support 21f. More specifically, the bearing 25 is formed as a metal bearing, such as an oil-impregnated metal bearing made of sintered metal impregnated with lubricant oil.

The worm wheel 23, which is received in the gear receiving portion 21c, is made integrally from a resin material and includes an annular gear portion 23b and a shaft fixing portion 23c. The gear portion 23b has an engaging part 23a at an outer peripheral part of the gear portion 23b to mesh with the worm 16a. The shaft fixing portion 23c is provided radially inward of the gear portion 23b, i.e., is provided at a center part of the worm wheel 23 and is bulged on one axial side of the worm wheel 23. The output shaft 22 may be made of, for example, metal (alternatively, rigid resin). A base end portion of the output shaft 22 is fixed to the shaft fixing portion 23c by, for example, insert molding.

Furthermore, a receiving recess 23d, which is axially recessed and has a circular cross section, is provided to the the center part of the worm wheel 23 on the other axial side thereof (side opposite from the bulging direction of the shaft fixing portion 23c). An inner diameter of the receiving recess 23d is set to be larger than an outer diameter of an inner projecting part of the shaft support 21f, which axially inwardly projects toward the worm wheel 23. The receiving recess 23d receives a generally entire part of the inner projection part of the shaft support 21f, i.e., receives an axially inner part of the bearing 25. At this time, an axial location of a contact point (a pitch point) P2 of the engaging part 23a of the the worm wheel 23 overlaps with an axial extent of the bearing 25 when the output shaft 22 is viewed in a direction perpendicular to an axis La of the output shaft 22.

A circular gear opening 21h is provided to the gear receiving portion 21c on a side opposite from shaft support 21f to receive the worm wheel 23. A plate cover 26 made of a resin material is installed to close the gear opening 21h. A receiving recess 26a, which has a circular cross section, is formed at a center part of the plate cover 26 to receive the shaft fixing portion 23c of the worm wheel 23. An annular supporting projection (supporting portion) 26b projects along an opening edge of the receiving recess 26a. An annular conductive plate (rotator) 27 is rotatably fitted to an outer peripheral part of the supporting projection 26b. The plate cover 26 is installed to the gear opening 21h in such a manner that the supporting projection 26b is coaxial with the shaft support 21f (bearing 25), and a rotational center of the conductive plate 27 coincides with a rotational center of the worm wheel 23.

The conductive plate 27 is connected to the worm wheel 23 through a connecting member 28 in such a manner that the conductive plate 27 is rotated integrally with the worm wheel 23. A conductive pattern (not shown) of a predetermined configuration is formed integrally on a surface of the conductive plate 27 on a side opposite from the worm wheel 23. Multiple contact members 29, which are made of metal, are provided to the plate cover 26 side to make a slide contact with the conductive pattern of the conductive plate 27 at a corresponding predetermined location. For example, corresponding two of the contact members 29 can be electrically connected with each other through a corresponding portion of the conductive pattern of the conductive plate 27 at one rotational position of the worm wheel 23, i.e., of the output shaft 22 and can be electrically disconnected from each other upon disconnection of the corresponding portion of the conductive pattern from these contact members 29 at another rotational position of the worm wheel 23, i.e., of the output shaft 22. Thus, the rotational position of the output shaft 22 can be sensed by sensing the electrically connecting state and the electrically disconnecting state described above. That is, the contact members 29 and the conductive plate 27 form a position sensor 30, which senses the rotational position of the output shaft 22.

As shown in FIG. 2, a connector 26c is formed integrally with the plate cover 26 to connect with a vehicle body side connector (not shown), which extends from a vehicle body side controller. The connector 26c receives electric power supply from the vehicle body side controller and outputs a sensor signal from the position sensor 30 to the vehicle side controller. The controller provides the electric power supply to the power supply brushes 19a-19c through the connector 26c based on the sensor signal from the position sensor 30, i.e., based on the rotational position of the output shaft 22 to control rotation of the motor unit 11.

Figure 3:
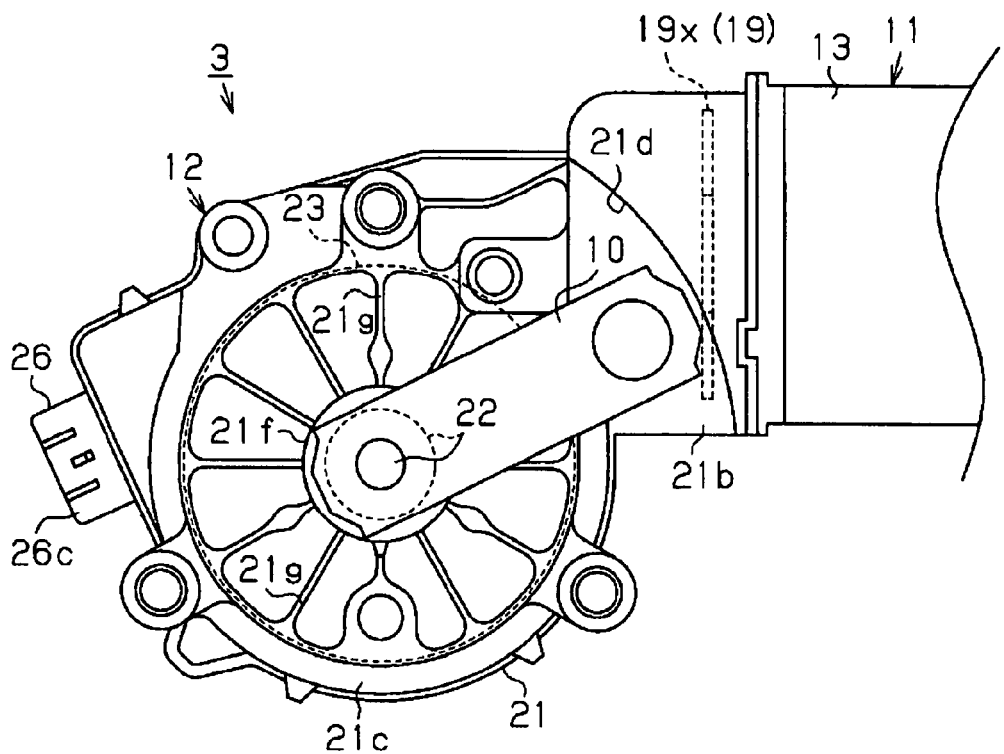
FIG. 3 is a partial plan view of the motor of the present embodiment.

When the rotatable shaft 16 is rotated by the motor unit 11 upon supplying of the electric power to the motor unit 11, a rotational speed of the rotatable shaft 16 is reduced through the worm 16a and the worm wheel 23, which are meshed with each other, so that the worm wheel 23 is rotated at a reduced rotational speed. The rotation of the worm wheel 23 causes rotation of the output shaft 22, which in turn causes rotation of the crank arm 10 (FIGS. 3 and 5). Then, with reference to FIG. 1, the pivot levers 8a, 8b are reciprocally swung through the rotation of the crank arm 10 through the link rod 9, so that the pivot shafts 4a, 4b are reciprocally swung within the predetermined angular range thereof by the pivot levers 8a, 8b to swing the wipers.

When the load (wipers) is driven by the output shaft 22, a tilting force, which tends to tilt the output shaft 22, may be generated. The tilting of the output shaft 22 is particularly notable in the case where the crank arm 10 is driven by the output shaft 22 like in the present embodiment. In such a case, as shown in FIG. 5, output shaft 22 is tilted about a fulcrum P1, which is located at an axial center point of the bearing 25 along a central axis of the bearing 25, which coincides with the axis La of the output shaft 22.

Figure 6:
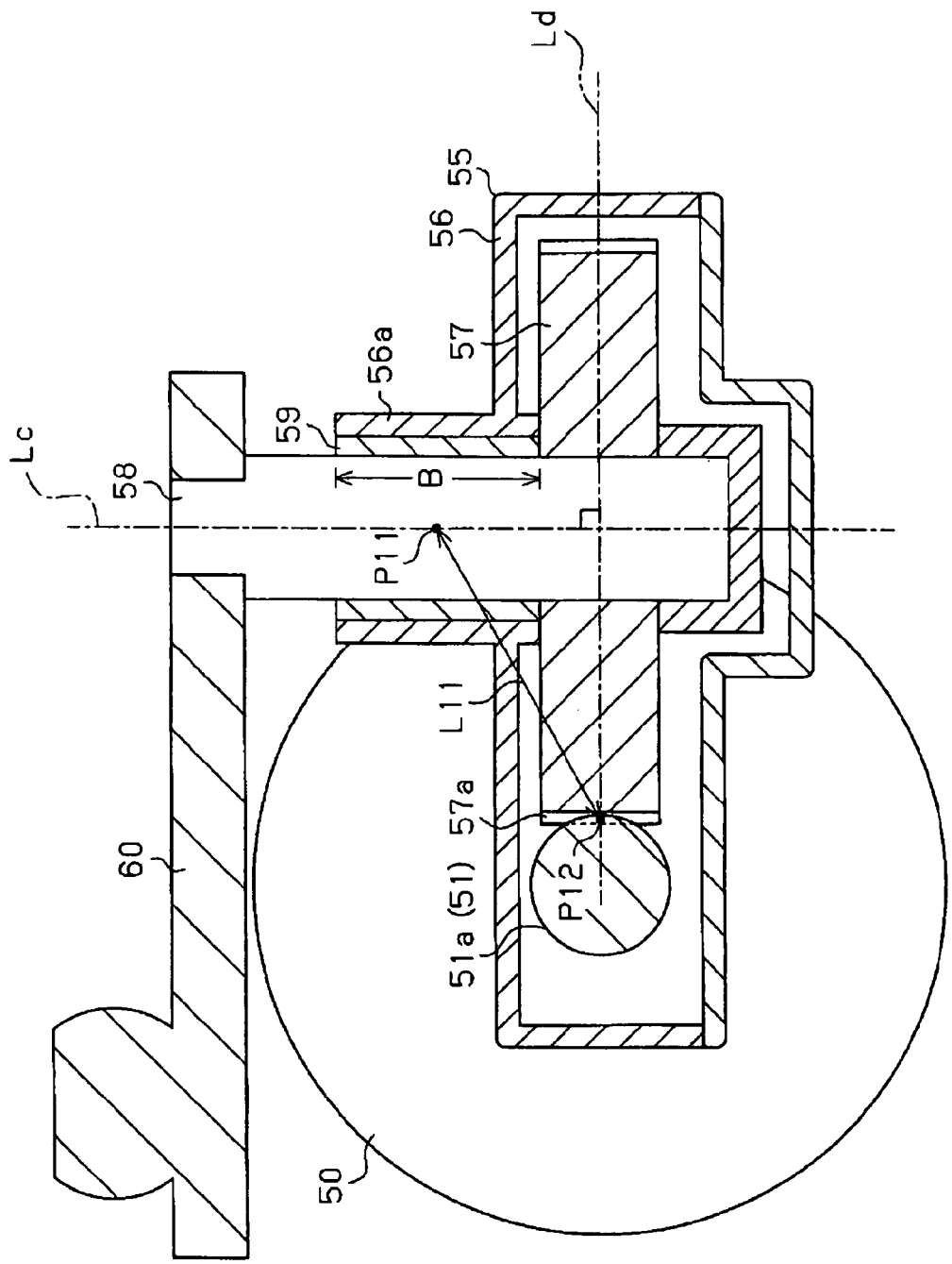
FIG. 6 is cross sectional view showing an output shaft of a prior art motor.

In view of the above point, according to the present embodiment, the receiving recess 23d is provided to the center part of the worm wheel 23, and the inner projecting part of the shaft support 21f, i.e., the axially inner part of the bearing 25 is received in the receiving recess 23d. Thereby, a distance L1 from the fulcrum P1 and the contact point (pitch point) P2 between the worm wheel 23 and the worm 16a is advantageously reduced in comparison to the distance L11 of the case shown in FIG. 6. Particularly, according to the present embodiment, the bearing 25 is inserted into the receiving recess 23d at a predetermined location where a straight line Lb, which is perpendicular to the axis La of the output shaft 22 and passes through the contact point (pitch point) P2, is placed in an axial support range A of the bearing 25. Thus, the distance L1 between the fulcrum P1 and the contact point P2 is advantageously reduced.

In this way, the tilt of the output shaft 22 is effectively limited to reduce a change in an engaged state between the engaging part 23a of the worm wheel 23 and the worm 16a, so that the disadvantages, such as the generation of noise as well as frictional wearing at the engaged part between the engaging part 23a of the worm wheel 23 and the worm 16a, are advantageously reduced. Furthermore, it should be noted that the output shaft 22 could be also tilted about the fulcrum P1 by an urging force, which is generated by the rotation of the worm 16a to push the worm wheel 23 in a direction away from the worm 16a. In such a case, the reduction in the distance L1 between the contact point P2 and the fulcrum P1 will result in a reduction in a degree of tilt of the output shaft 22 to reduce the load applied from the output shaft 22 to the bearing 25. Even in this way, the disadvantages, such as the generation of the sliding noise from the bearing 25 and the frictional wearing of the bearing 25, can be advantageously reduced. Particularly, according to the present embodiment, the bearing 25 is positioned such that the straight line Lb, which is perpendicular to the axis La of the output shaft 22 and passes through the contact point P2, is placed in the axial support range A of the bearing 25. Thus, the force at the contact point P2 acting in the contact direction is received by the bearing 25 and is thereby limited from acting on the output shaft 22 to tilt the output shaft 22.

Next, the advantages of the present embodiment will be described.

(1) According to the present embodiment, the receiving recess 23d, which is recessed in the axial direction, is provided at the center part of the worm wheel 23, and the axially inner part of the bearing 25, which supports the output shaft 22, is received in the receiving recess 23d. That is, at least a portion of the bearing 25 is placed in the receiving recess 23d of the worm wheel 23, so that the distance L1 from the fulcrum P1, about which the output shaft 22 is tilted, to the contact point P2 between the worm wheel 23 and the worm 16a is reduced. In this way, the tilt of the output shaft 22 is limited to reduce the change in the engaged state between the worm wheel 23 and the worm 16a, so that the disadvantages, such as the generation of noise as well as frictional wearing at the engaged part between the worm wheel 23 and the worm 16a, are advantageously reduced. Furthermore, the urging force, which urges the worm wheel 23 in the direction away from the worm 16a, is generated by the rotation of the worm 16a upon the operation of the motor unit 11 to cause the tilting of the output shaft 22 about the fulcrum P1. In such a case, the reduction in the distance L1 between the contact point P2 and the fulcrum P1 will result in the reduction in the degree of tilt of the output shaft 22 to reduce the load applied from the output shaft 22 to the bearing 25. Even in this way, the disadvantages, such as the generation of the sliding noise from the bearing 25 and the frictional wearing of the bearing 25, can be advantageously reduced.

Furthermore, in the wiper apparatus 1 of the present embodiment, in which the crank arm 10 is driven by the output shaft 22 of the motor 3 to reciprocally swing the wipers, the output shaft 22 tends to be tilted. Thus, the present invention can be advantageously implemented in the motor 3 of the wiper apparatus 1 of the present embodiment.

(2) According to the present embodiment, the bearing 25 is positioned such that the straight line Lb, which is perpendicular to the axis La of the output shaft 22 and passes through the contact point P2, is placed in the axial support range A of the bearing 25. Thus, the force at the contact point P2 acting in the contact direction is received by the bearing 25 and is thereby limited from acting on the output shaft 22 to tilt the output shaft 22. Therefore, it is possible to limit the force, which acts on the output shaft 22 to tilt the output shaft 22, and thereby it is possible to advantageously alleviate the disadvantages.

(3) According to the present embodiment, the shaft support 21f, at which the bearing 25 is provided, projects into the interior of the gear housing 21, and the inner projecting part of the shaft support 21f is received in the receiving recess 23d of the worm wheel 23. That is, at least a portion of the bearing 25 is placed in the receiving recess 23d of the worm wheel 23, and the shaft support 21f, at which the bearing 25 is provided, is also received in the receiving recess 23d. In this way, the amount of projection of the shaft support 21f from the outer surface of the gear housing 21 is advantageously limited. According to the present embodiment, the recess 21d is provided to the outer surface of the gear housing 21 to avoid the interference with the distal end portion of the crank arm 10. Thus, the height of the speed reducer 12 can be advantageously limited, and the motor 3 can be advantageously made compact.

(4) According to the present embodiment, the center part of the worm wheel 23 is bulged on the one axial side of the worm wheel 23, and the receiving recess 23d is provided on the other axial side of the worm wheel 23. In this way, the rigidity of the center part of the worm wheel 23 can be advantageously improved with the receiving recess 23d.

(5) According to the present embodiment, the supporting projection 26b is formed in the plate cover 26, which is installed to the gear opening 21h of the gear housing 21. Furthermore, the conductive plate 27 of the position sensor 30, which is engaged with the worm wheel 23 and is thereby rotated integrally with the worm wheel 23, is rotatably supported by the supporting projection 26b. In this way, the rotation of the conductive plate 27 is stabilized, and thereby the sensing accuracy of the position sensor 30 can be advantageously improved. Furthermore, the worm wheel 23 is indirectly supported through the supporting projection 26b through the conductive plate 27, so that the stable support of the worm wheel 23 can be advantageously enhanced.

The above embodiment may be modified as follows.

In the above embodiment, the receiving recess 23d is formed by bulging the center part of the worm wheel 23 on the one axial side of the worm wheel 23. Alternatively, the receiving recess 23d may be formed by, for example, simply recessing the center part of the worm wheel 23 without bulging the center part of the worm wheel 23.

In the above embodiment, the bearing 25 is inserted into the receiving recess 23d at the predetermined location where the straight line Lb, which is perpendicular to the axis La of the output shaft 22 and passes through the contact point P2, is placed in the axial support range A of the bearing 25. Alternatively, the inserted position of the bearing 25 may be modified in any appropriate manner.

In the above embodiment, the side of the worm wheel 23, which is opposite from the output shaft 22, is indirectly supported by the plate cover 26 through the conductive plate 27 of the position sensor 20. Alternatively, the side of the worm wheel 23, which is opposite from the output shaft 22, may be directly supported by the plate cover 26. Further alternatively, the side of the worm wheel 23, which is opposite from the output shaft 22, may be not supported at all.

In the above embodiment, the position sensor 30 is provided in the speed reducer 12. Alternatively, the position sensor 30 may be provided to any other suitable location. For example, the position sensor 30 may be provided to the motor unit 11 to sense a rotational position of the rotatable shaft 16 or to sense the rotational position of the output shaft 22 based on the sensed rotational position of the rotatable shaft 16. Further alternatively, the position sensor may be eliminated from the motor.

In the above embodiment, the worm 16a is formed integrally with the rotatable shaft 16. Alternatively, the worm 16a may be formed separately from the rotatable shaft 16 and may be coupled with the rotatable shaft 16 through, for example, a coupler or a clutch to conduct a drive force therebetween.

In the above embodiment, the three power supply brushes 19a-19c are provided in the motor unit 11. However, the number of the power supply brushes is not limited to three and may be modified to two or four or even more.

In the above embodiment, the present invention is implemented in the motor 3 of the wiper apparatus 1, in which the crank arm 10 is driven by the output shaft 22. However, the present invention is equally applicable to a motor of any other suitable apparatus, which is other than the wiper apparatus and does not drive a swing member, such as the crank arm 10.

Additional advantages and modifications will readily occur to those skilled in the art. The invention in its broader terms is therefore not limited to the specific details, representative apparatus, and illustrative examples shown and described.

What is claimed is:

1. A motor comprising:
    a motor unit that includes a rotatable shaft, which is rotated upon energization of the motor unit; and
    a speed reducer that includes:
        a gear housing that is connected to the motor unit;
        a worm that is received in the gear housing and is rotated by rotation of the rotatable shaft;
        a worm wheel that is received in the gear housing and is meshed with the worm; and
        an output shaft that is fixed to a center part of the worm wheel and is rotatably supported by the gear housing through a bearing to externally output a drive force, wherein:
    the worm wheel includes a receiving recess, which is axially recessed in the center part of the worm wheel, relative to an axial end of a tooth of the worm wheel, which is adapted to mesh with a tooth of the worm; and
    at least a portion of the bearing is received in the receiving recess.

2. The motor according to claim 1, wherein the bearing is received in the receiving recess at a predetermined location where a straight line, which is perpendicular to an axis of the output shaft and passes through a contact point between the worm and the worm wheel, is placed in an axial support range of the bearing.

3. The motor according to claim 1, wherein:
a cylindrical shaft support is provided to the gear housing to support the output shaft through the bearing; and
the shaft support projects into an interior of the gear housing to form an inner projecting part, which is received in the receiving recess.

4. The motor according to claim 1, wherein:
the center part of the worm wheel is bulged axially outward on a first axial side of the worm wheel; and
the receiving recess is formed in the center part of the worm wheel on a second axial side of the worm wheel, which is opposite from the first axial side of the worm wheel.

5. The motor according to claim 1, wherein:
the gear housing has a gear opening, through which the worm wheel is received into the gear housing;
a cover member is installed to the gear opening of the gear housing;
the cover member has a supporting portion that rotatably supports a rotator of a position sensor;
the rotator of the position sensor is engaged with the worm wheel to rotate integrally with the worm wheel; and
the position sensor senses a rotational position of the output shaft.

6. The motor according to claim 1, wherein the worm wheel further includes:
an engaging part that is meshed with the worm;
an annular gear portion that has the engaging part at an outer peripheral part of the gear portion;
a shaft fixing portion that is located radially inward of the gear portion and is axially bulged on a first axial side of the worm wheel, wherein:
the shaft fixing portion is fixed integrally to the output shaft, which is made of metal;
the receiving recess is radially positioned between the shaft fixing portion and the gear portion and is recessed on a second axial side of the worm wheel, which is opposite from the first axial side of the worm wheel; and
the engaging part, the gear portion, the shaft fixing portion and the receiving recess are molded integrally from a resin material.

7. The motor according to claim 1, wherein:
the motor is a wiper motor;
the output shaft is adapted to securely connect with a crank arm of a link mechanism of a wiper apparatus; and
the gear housing has a recess that is recessed away from a rotational path of the crank arm.

8. A wiper apparatus comprising:
the motor according to claim 1; and
a link mechanism that includes a crank arm, which is fixed to the output shaft of the motor and is rotated by the output shaft, wherein rotational movement of the crank arm is converted into reciprocal swing movement through the link mechanism to swing a wiper.

9. The motor according to claim 1,
wherein the bearing is adapted to slide relative to the output shaft and is received in the receiving recess, and
wherein the bearing is positioned such that a line that is perpendicular to an axis of the output shaft and passes through a rotational axis of the worm extends through a portion of a cylindrical inner peripheral surface of the bearing.

10. A motor comprising:
a motor unit that includes a rotatable shaft, which is rotated upon energization of the motor unit; and
a speed reducer that includes:
a gear housing that is connected to the motor unit;
a worm that is received in the gear housing and is rotated by rotation of the rotatable shaft;
a worm wheel that is received in the gear housing and is meshed with the worm; and
an output shaft that is fixed to a center part of the worm wheel and is rotatably supported by the gear housing through a bearing to externally output a drive force, wherein:
the worm wheel includes a receiving recess, which is axially recessed in the center part of the worm wheel,
the bearing is adapted to slide relative to the output shaft and is received at least partially in the receiving recess, and
the bearing is positioned such that a line that is perpendicular to an axis of the output shaft and passes through a rotational axis of the worm extends through a portion of a cylindrical inner peripheral surface of the bearing.

11. The motor according to claim 10, wherein the receiving recess is axially recessed in the center part of the worm wheel, relative to an axial end of a tooth of the worm wheel, which is adapted to mesh with a tooth of the worm.

12. The motor according to claim 10, wherein the bearing is received in the receiving recess at a predetermined location where a straight line, which is perpendicular to the axis of the output shaft and passes through a contact point between the worm and the worm wheel, is placed in an axial support range of the bearing.

13. The motor according to claim 10, wherein:
a cylindrical shaft support is provided to the gear housing to support the output shaft through the bearing; and
the shaft support projects into an interior of the gear housing to form an inner projecting part, which is received in the receiving recess.

14. The motor according to claim 10, wherein:
the center part of the worm wheel is bulged axially outward on a first axial side of the worm wheel; and
the receiving recess is formed in the center part of the worm wheel on a second axial side of the worm wheel, which is opposite from the first axial side of the worm wheel.

15. The motor according to claim 10, wherein:
the gear housing has a gear opening, through which the worm wheel is received into the gear housing;
a cover member is installed to the gear opening of the gear housing;
the cover member has a supporting portion that rotatably supports a rotator of a position sensor;
the rotator of the position sensor is engaged with the worm wheel to rotate integrally with the worm wheel; and
the position sensor senses a rotational position of the output shaft.

16. The motor according to claim 10, wherein the worm wheel further includes:
an engaging part that is meshed with the worm;
an annular gear portion that has the engaging part at an outer peripheral part of the gear portion;
a shaft fixing portion that is located radially inward of the gear portion and is axially bulged on a first axial side of the worm wheel, wherein:
the shaft fixing portion is fixed integrally to the output shaft, which is made of metal;
the receiving recess is radially positioned between the shaft fixing portion and the gear portion and is recessed on a second axial side of the worm wheel, which is opposite from the first axial side of the worm wheel; and the engaging part, the gear portion, the shaft fixing portion and the receiving recess are molded integrally from a resin material.

17. The motor according to claim 10, wherein:

the motor is a wiper motor;

the output shaft is adapted to securely connect with a crank arm of a link mechanism of a wiper apparatus; and the gear housing has a recess that is recessed away from a rotational path of the crank arm.

18. A wiper apparatus comprising:

the motor according to claim 10; and a link mechanism that includes a crank arm, which is fixed to the output shaft of the motor and is rotated by the output shaft, wherein rotational movement of the crank arm is converted into reciprocal swing movement through the link mechanism to swing a wiper.

\* \* \* \* \*